(12) United States Patent
Dohi et al.

(10) Patent No.: US 8,647,511 B2
(45) Date of Patent: Feb. 11, 2014

(54) METHOD FOR RECOVERING CORROSION PREVENTIVE AGENT IN ELECTRODISCHARGE MACHINING LIQUID SUPPLY APPARATUS

(75) Inventors: Yuzo Dohi, Kanagawa (JP); Yasunori Takahashi, Sakai (JP)

(73) Assignee: Sodick Co., Ltd., Kanagawa (JP)

( * ) Notice: Subject to any disclaimer, the term of this patent is extended or adjusted under 35 U.S.C. 154(b) by 303 days.

(21) Appl. No.: 13/125,259

(22) PCT Filed: Oct. 26, 2009

(86) PCT No.: PCT/JP2009/005628
§ 371 (c)(1),
(2), (4) Date: Jun. 24, 2011

(87) PCT Pub. No.: WO2010/047135
PCT Pub. Date: Apr. 29, 2010

(65) Prior Publication Data
US 2011/0240558 A1    Oct. 6, 2011

(30) Foreign Application Priority Data
Oct. 24, 2008   (JP) ................... 2008-274718

(51) Int. Cl.
*C02F 1/42* (2006.01)
(52) U.S. Cl.
USPC ............... 210/673; 210/686; 210/692

(58) Field of Classification Search
USPC ................. 210/171, 673, 686, 692
See application file for complete search history.

(56) References Cited

U.S. PATENT DOCUMENTS

| | | | | |
|---|---|---|---|---|
| 5,081,333 | A | * | 1/1992 | Yatomi et al. ............ 219/69.14 |
| 5,443,740 | A | * | 8/1995 | Schmitt ..................... 210/673 |
| 2008/0188162 | A1 | * | 8/2008 | Kobata et al. .................. 451/8 |
| 2009/0057274 | A1 | | 3/2009 | Nakajima et al. ......... 219/69.14 |
| 2009/0277876 | A1 | | 11/2009 | Kawarai et al. |

FOREIGN PATENT DOCUMENTS

| | | |
|---|---|---|
| JP | 62-251013 | 10/1987 |
| JP | 04-250921 | 9/1992 |
| JP | 05-169318 | 7/1993 |
| WO | 2008/047420 | 4/2008 |

* cited by examiner

*Primary Examiner* — Matthew O Savage
(74) *Attorney, Agent, or Firm* — J.C. Patents

(57) ABSTRACT

Disclosed is a method for recovering a corrosion preventive agent in an electrodischarge machining liquid supply apparatus. The method includes the step of passing a first electrodischarge machining liquid having a corrosion preventive agent added thereto through, an ion exchange resin column to maintain a suitable specific resistance of the first liquid, and the step of passing a second liquid free from a corrosion preventive agent through the ion exchange resin column to desorb the corrosion preventive agent adsorbed in the ion exchange resin column. The second liquid is, for example, tap water or a machining liquid having a low corrosion preventive agent concentration. The corrosion preventive agent is, for example, adenine which is a purine base.

9 Claims, 4 Drawing Sheets

METHOD FOR RECOVERING CORROSION PREVENTIVE AGENT IN ELECTRODISCHARGE MACHINING LIQUID SUPPLY APPARATUS

CROSS-REFERENCE TO RELATED APPLICATION

This application claims the priority benefit of Japan application serial no. 2008-274718, filed Oct. 24, 2008. The entirety of the above-mentioned patent application is hereby incorporated by reference herein and made a part of this specification.

BACKGROUND OF THE INVENTION

1. Field of the Invention

The present invention generally relates to an electrodischarge machining (EDM) device, which is used to machine a work piece by supplying a dielectric liquid to a machining gap formed between a tool electrode and a metal work piece, and applying a voltage pulse to the machining gap, in particular, to an EDM liquid supply apparatus having an ion exchange resin column for maintaining a suitable specific resistance of a water-based dielectric liquid.

2. Description of Related Art

In EDM apparatus, in order to generate an intermittent electrodischarge in the machining gap, a dielectric liquid with a high specific resistance is supplied to a machining gap. A suitable specific resistance of a water-based dielectric liquid (referred as a machining liquid) is generally $5 \times 10^4 \, \Omega \cdot cm^{-1} \times 10^5 \, \Omega \cdot cm$. In general, the EDM apparatus is provided with a specific resistance detector and an ion exchange resin column. If the detection value of the specific resistance is lower than a set value, the machining liquid in a storage tank is circulated through the ion exchange resin column.

In many cases, the EDM apparatus is used to fabricate a mold made of hard materials. Such a mold is made of steel or a super-hard alloy. The super-hard alloys refer to alloys formed by sintering powder of metal carbides, especially the well-known super-hard alloy formed by sintering tungsten carbide and cobalt as binder.

During EDM, it is known that electric corrosion may occur to work pieces made of steel or super-hard alloys. The cause of electric corrosion is considered as follows. A corrosion current flows between a tool electrode as a negative pole and the work piece as a positive pole due to the potential difference therebetween, and thus the material of the work piece is dissolved. In order to prevent the undesired electric corrosion, it is known that a machining liquid having a corrosion preventive agent or a rust preventive agent added is used. The machining liquid is disclosed in Patent Document 1 and Patent Document 2.

PRIOR ART DOCUMENTS

Patent Documents

Patent Document 1: Japanese Patent Publication No. S62-251013.
Patent Document 2: Japanese Patent Publication No. H4-250921.

Depending on its ingredients, the corrosion preventive agent would inevitably be adsorbed on the ion exchange resin. In order to maintain suitable concentration of the corrosion preventive agent in the machining liquid, it is necessary to replenish the corrosion preventive agent. As a result, the running cost is increased.

SUMMARY OF THE INVENTION

Accordingly, the present invention is directed to a method for recovering a corrosion preventive agent adsorbed on an ion exchange resin with low cost and high efficiency.

The method for recovering a corrosion preventive agent in an EDM liquid supply apparatus of the present invention includes: a step of passing a first EDM liquid, which is added with a corrosion preventive agent, through an ion exchange resin column to maintain a suitable specific resistance of the first liquid; and a step of passing a second liquid free from the corrosion preventive agent through the ion exchange resin column to desorb the corrosion preventive agent adsorbed on the ion exchange resin column. The second liquid is water having a specific resistance lower than the first liquid, for example, tap water.

Furthermore, the method for recovering a corrosion preventive agent in an EDM liquid supply apparatus of the present invention includes: a step of passing a machining liquid, which is added with a corrosion preventive agent, through a first ion exchange resin column (40) to maintain a suitable specific resistance of the machining liquid; a step of connecting an inlet of a second ion exchange resin column (50) with more corrosion preventive agent adsorbed thereon than that adsorbed on the first ion exchange resin column to an outlet of the first ion exchange resin column; and a step of passing the machining liquid from the first ion exchange resin column through the second ion exchange resin column to desorb the corrosion preventive agent adsorbed on the second ion exchange resin column. The corrosion preventive agent is, for example, a purine base, such as adenine.

Effect of the Invention

According to the method for recovering a corrosion preventive agent in an EDM liquid supply apparatus of the present invention, the corrosion preventive agent adsorbed on the ion exchange resin can be recovered with low cost and high efficiency.

DESCRIPTION OF THE EMBODIMENTS

Figure 1:
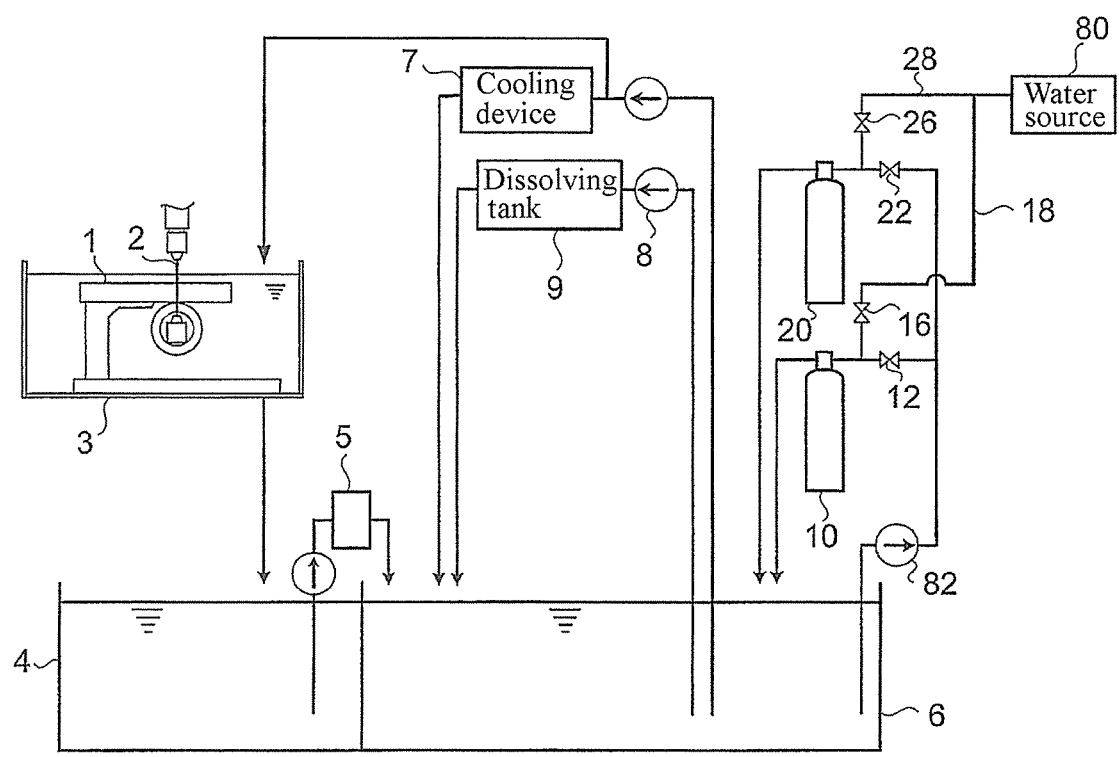
FIG. 1 is a piping diagram of an EDM liquid supply apparatus adopting a method for recovering a corrosion preventive agent according to a first embodiment.

With reference to the drawings, a method for recovering a corrosion preventive agent according to a first embodiment is illustrated. As shown in FIG. 1, an EDM apparatus is provided with a machining tank 3 for accommodating a work piece 1. The work piece 1 is fixed on a suitable work support, and a wire electrode 2 as a tool is vertically supported. The machining tank 3 is filled with the machining liquid, and the work piece 1 is immersed in the machining liquid. In order to perform electrodischarge machining, a power supply (not shown) for applying a voltage pulse between the work piece 1 and the wire electrode 2 is disposed.

The machining liquid storage tank includes a contaminated liquid tank 4 and a clean liquid tank 6. The machining liquid in the machining tank 3 is discharged to the contaminated liquid tank 4. The machining liquid in the contaminated liquid tank 4 is sent to the clean liquid tank 6 through a filter 5. The machining liquid in the clean liquid tank 6 is circulated through a cooling device 7. The cooling device 7 detects the temperature of the machining liquid and maintains the temperature at a preset value.

The machining liquid in the clean liquid tank 6 is circulated through a dissolving tank 9 timely by using a pump 8. The dissolving tank 9 accommodates corrosion preventive agent powder wrapped in a packaging material. The packaging material is, for example, water-permeable non-woven fabric. The concentration of the corrosion preventive agent in the machining liquid can be controlled by adjusting the discharge rate of the pump 8. The dissolving tank 9 adds adenine powder (6-aminopurine) [CAS Registry Number73-24-5] as shown in Chemical Formula I into the machining liquid as a corrosion preventive agent.

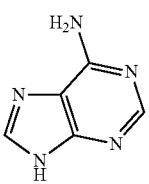

[Chemical Formula1]

The machining liquid having adenine as a purine base added is used to prevent the corrosion of the work piece 1. However, adenine is adsorbed on the ion exchange resin, thus resulting in the decrease of the concentration of adenine in the machining liquid.

The machining liquid in the clean liquid tank 6 is circulated through a first ion exchange resin column 10 or a second ion exchange resin column 20 timely by using a pump 82. A valve 12 is disposed between the pump 82 and the first ion exchange resin column 10, and a valve 22 is disposed between the pump 82 and the second ion exchange resin column 20. When allowing the machining liquid to pass through one of the resin columns 10 and 20, the valves 12 and 22 are controlled in such a manner that the machining liquid will not flow into the other resin column.

The first ion exchange resin column 10 and the second ion exchange resin column 20 are disposed in parallel between a water source 80 and the clean liquid tank 6. The water source 80 is disposed to supply water free from the corrosion preventive agent, for example, tap water. The specific resistance of tap water is $10^4$ Ω·cm below. The water source 80 is connected to the first ion exchange resin column 10 through a first liquid flow path 18, and is connected to the second ion exchange resin column 20 through a second liquid flow path 28. A valve 16 is disposed on the first liquid flow path 18, and a valve 26 is disposed on the second liquid flow path 28.

Figure 2:
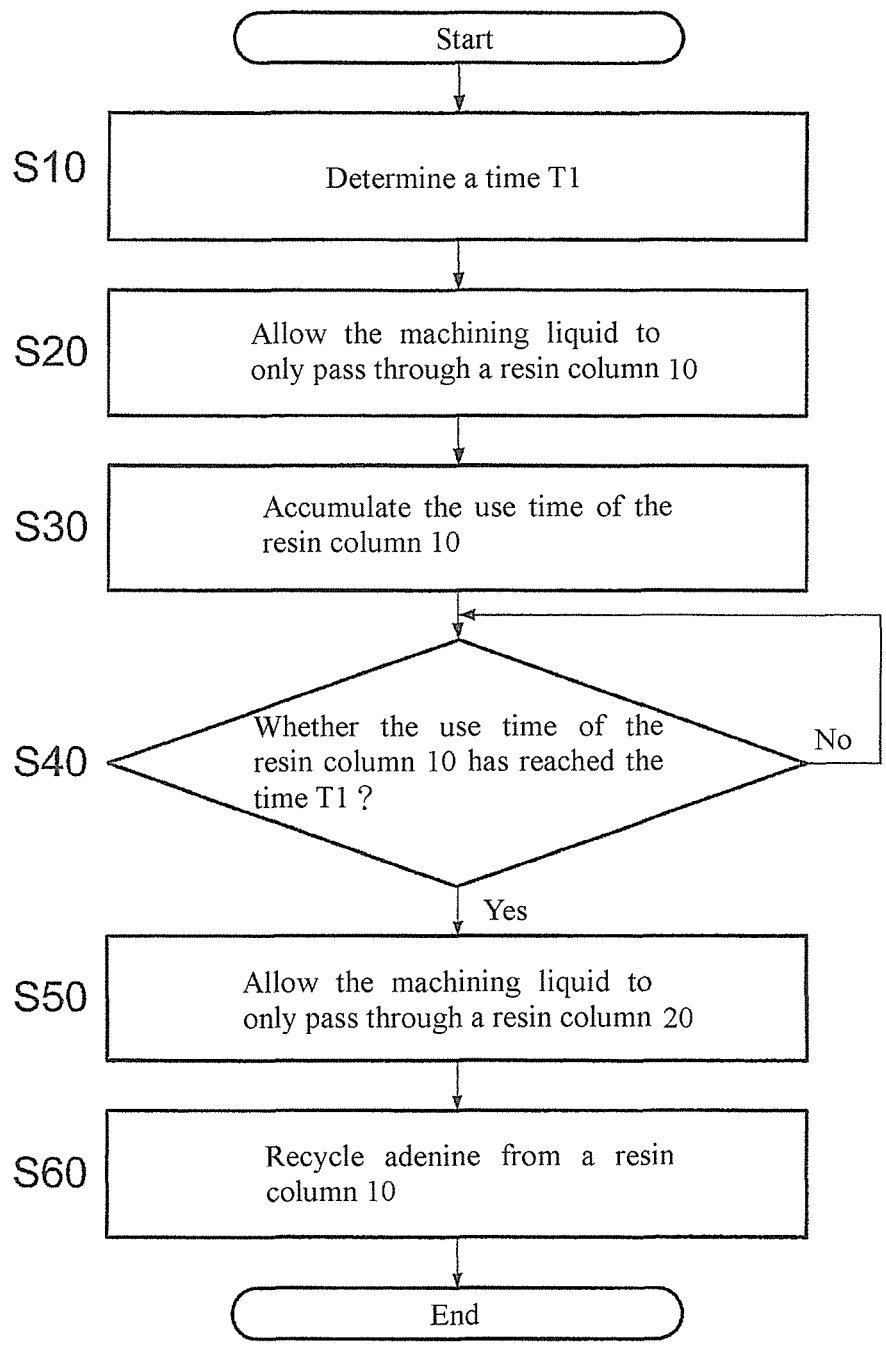
FIG. 2 is a flow chart of the method for recovering a corrosion preventive agent according to the first embodiment.

Referring to FIG. 2, an example of the method for recovering adenine from the first ion exchange resin column 10 is illustrated. First, in Step S10, a time T1 is determined. In Step S20, the valve 12 is opened when the valves 22, 16, and 26 are closed, such that the machining liquid in the clean liquid tank 6 is allowed to pass through the ion exchange resin column 10. From then on, the operating time of the first ion exchange resin column 10 is accumulated in Step S30.

Furthermore, the machining liquid in the clean liquid tank 6 is sent to the cooling device 7 and the dissolving tank 9. Thus, the specific resistance and the temperature of the machining liquid are adjusted to suitable values, and adenine is added to the machining liquid. The machining liquid in the clean liquid tank 6 is supplied into the machining tank 3, such that the machining tank 3 is filled with the machining liquid. Even after the start of EDM, the machining liquid is supplied into the machining tank 3. The machining liquid overflowed from the machining tank 3 is recovered into the contaminated liquid tank 4.

In Step S40, if the operating time of the first ion exchange resin column 10 reaches the time T1, a control device determines to recover adenine in the ion exchange resin column 10. In response to a control signal of the control device, the valve 12 is closed, and the valves 22 and 16 are opened. Thus, in Step S50, the machining liquid in the clean liquid tank 6 is circulated through the second ion exchange resin column 20. In Step S60, the tap water is supplied into the first ion exchange resin column 10 through the first liquid flow path 18. Adenine desorbed from the resin in the resin column 10 is supplied into the clean liquid tank 6.

Next, the method for recovering adenine from the second ion exchange resin column 20 is implemented similarly. If the operating time of the second ion exchange resin column 20 reaches a time T2, the control device determines to recover adenine in the ion exchange resin column 20. The time T2 may be the same as the time T1. In response to a control signal of the control device, the valve 22 is closed, and the valves 12 and 26 are opened. Thus, the machining liquid in the clean liquid tank 6 is circulated through the first ion exchange resin column 10. The tap water is supplied into the second ion exchange resin column 20 through the second liquid flow path 28. Adenine desorbed from the resin in the resin column 20 is supplied to the clean liquid tank 6.

The inventor confirms that adenine recovered from the ion exchange resin column can effectively prevent corrosion of the work piece 1. Furthermore, the inventor confirms that the tap water having a specific resistance lower than that of the machining liquid can desorb more adenine from the resin.

Figure 3:
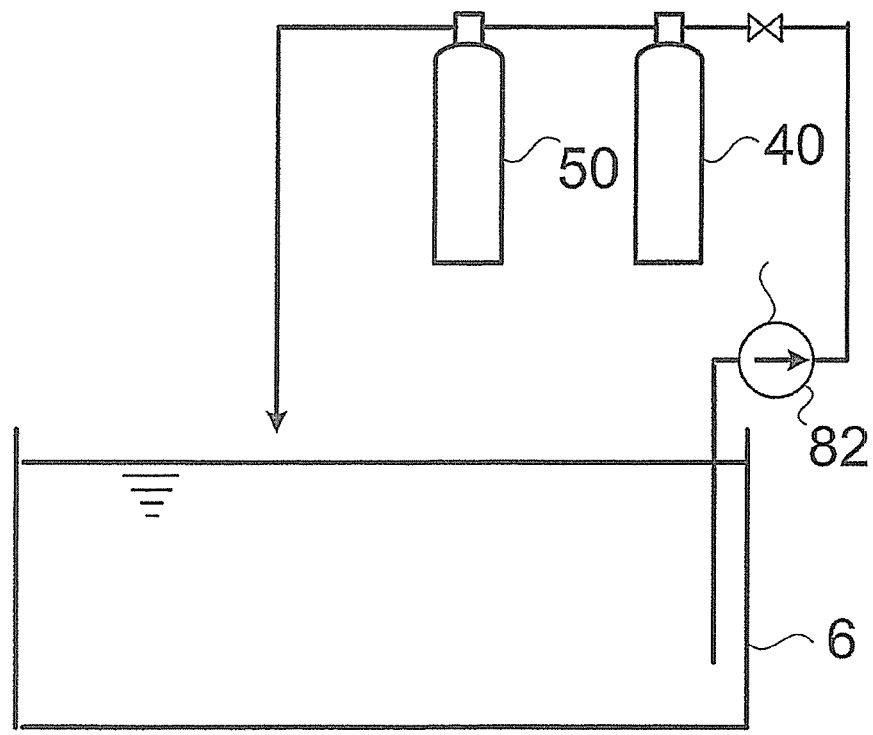
FIG. 3 is a piping diagram of an EDM liquid supply apparatus adopting a method for recovering a corrosion preventive agent according to a second embodiment.

Referring to FIG. 3, a method for recovering a corrosion preventive agent according to a second embodiment is illustrated. The same elements as those in FIG. 1 are designated by the same reference number, and the description thereof is omitted. In the EDM liquid supply apparatus in FIG. 3, an outlet of an ion exchange resin column 40 is connected to an inlet of an ion exchange resin column 50. The ion exchange resin column 40 is capable of maintaining a suitable specific resistance of the machining liquid. The added ion exchange resin column 50 is an ion exchange resin column that has been used for a long period of time, and the ion exchange reaction of the resin in the resin column 50 has reached equilibrium. Therefore, more adenine is adsorbed on the added ion exchange resin column 50 than that adsorbed on the resin column 40.

The machining liquid in the clean liquid tank 6 passes through the ion exchange resin columns 40 and 50 in sequence. The specific resistance of the machining liquid is improved by the ion exchange resin column 40, but more adenine is adsorbed on the resin column 40. Therefore, the machining liquid having a considerable low concentration of adenine is supplied into the added ion exchange resin column 50 through the outlet of the ion exchange resin column 40.

Thus, adenine desorbed from the added ion exchange resin column 50 is replenished into to the machining liquid in the clean liquid tank 6.

Figure 4:
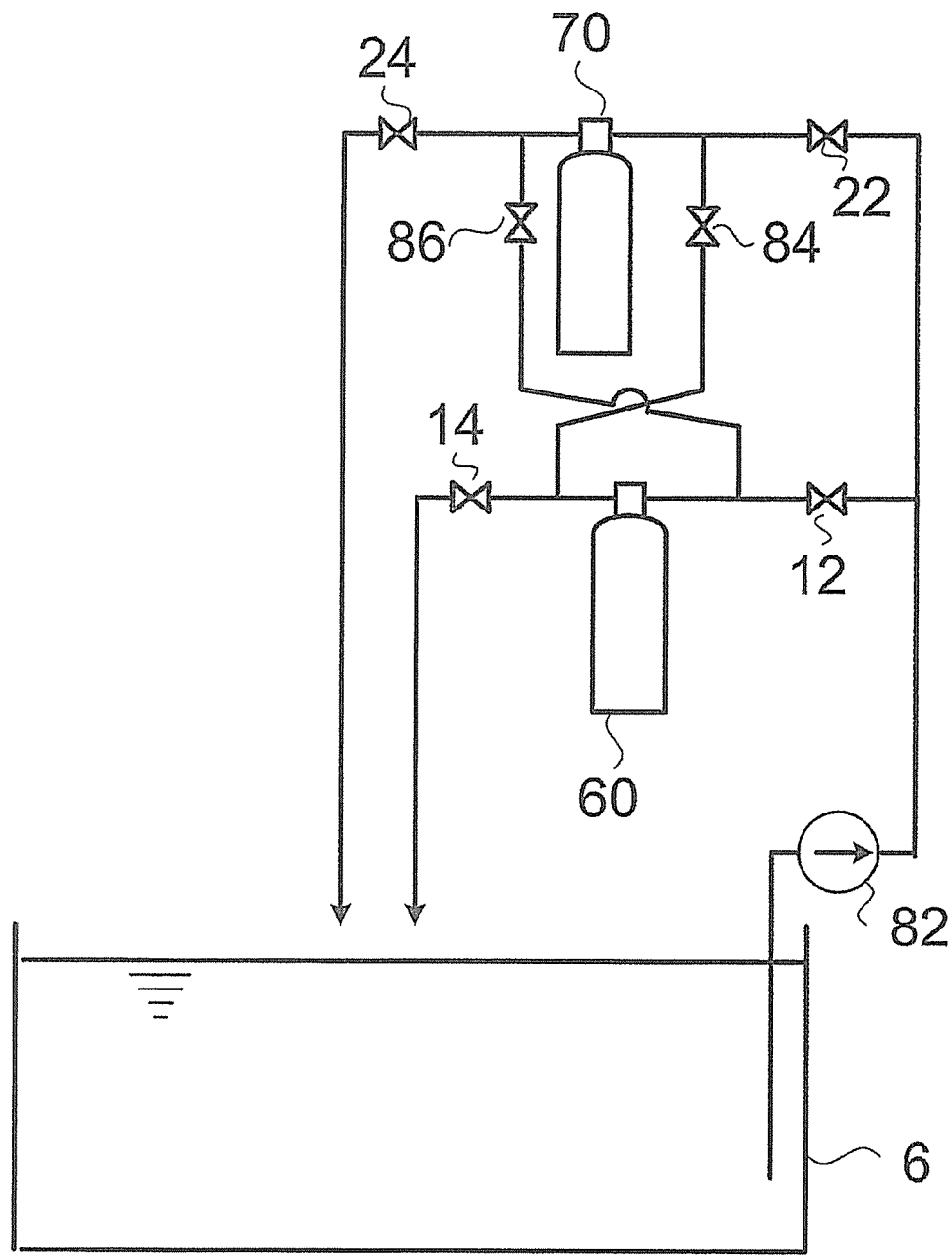
FIG. 4 is a piping diagram of an EDM liquid supply apparatus adopting a method for recovering a corrosion preventive agent according to a third embodiment.

Referring to FIG. 4, a method for recovering a corrosion preventive agent according to a third embodiment is illustrated. The same elements as those in FIG. 1 are designated by the same reference number, and the description thereof is omitted. An outlet of a first ion exchange resin column 60 is connected to the clean liquid tank 6 through a valve 14, and is connected to an inlet of a second ion exchange resin column 70 through a valve 84. An outlet of the second ion exchange resin column 70 is connected to the clean liquid tank 6 through a valve 24, and is connected to an inlet of the first ion exchange resin column 60 through a valve 86.

When more adenine is adsorbed on the second ion exchange resin column 70 than that adsorbed on the first ion exchange resin column 60, the valves 22, 14, and 86 are closed, and the valves 12, 24, and 84 are opened. Thus, the machining liquid in the clean liquid tank 6 passes through the first ion exchange resin column 60 and the second ion exchange resin column 70 in sequence. When more adenine is adsorbed on the first ion exchange resin column 60 than that adsorbed on the second ion exchange resin column 70, the valves 12, 24, and 84 are closed, and the valves 22, 14, and 86 are opened. Thus, the machining liquid in the clean liquid tank 6 passes through the second ion exchange resin column 70 and the first ion exchange resin column 60 in sequence.

What is claimed is:

1. A method for recovering a corrosion preventive agent in an electrodischarge machining (EDM) liquid supply apparatus, comprising:
    a step of passing a first liquid, which is for the EDM and is added with a corrosion preventive agent, through an ion exchange resin column to maintain a suitable specific resistance of the first liquid;
    a step of passing a second liquid free from the corrosion preventive agent through the ion exchange resin column to desorb the corrosion preventive agent adsorbed on the ion exchange resin column; and
    a step of returning the second liquid containing the desorbed corrosion preventive agent to a portion of the EDM liquid supply apparatus containing the first liquid having the suitable specific resistance.

2. The method for recovering a corrosion preventive agent in an EDM liquid supply apparatus according to claim 1, wherein the specific resistance of the second liquid is lower than that of the first liquid.

3. The method for recovering a corrosion preventive agent in an EDM liquid supply apparatus according to claim 2, wherein the corrosion preventive agent comprises a purine base.

4. The method for recovering a corrosion preventive agent in an EDM liquid supply apparatus according to claim 3, wherein the purine base is adenine.

5. The method for recovering a corrosion preventive agent in an EDM liquid supply apparatus according to claim 1, wherein the corrosion preventive agent comprises a purine base.

6. The method for recovering a corrosion preventive agent in an EDM liquid supply apparatus according to claim 5, wherein the purine base is adenine.

7. A method for recovering a corrosion preventive agent in an electrodischarge machining (EDM) liquid supply apparatus, comprising:
    a step of passing a machining liquid which is added with a corrosion preventive agent through a first ion exchange resin column to maintain a suitable specific resistance of the machining liquid;
    a step of connecting an inlet of a second ion exchange resin column with more corrosion preventive agent adsorbed thereon than that adsorbed on the first ion exchange resin column to an outlet of the first ion exchange resin column;
    a step of passing the machining liquid from the first ion exchange resin column through the second ion exchange resin column to desorb the corrosion preventive agent adsorbed on the second ion exchange resin column; and
    a step of returning the desorbed corrosion preventive agent to a portion of the EDM liquid supply apparatus containing the machining liquid having the suitable specific resistance.

8. The method for recovering a corrosion preventive agent in an EDM liquid supply apparatus according to claim 7, wherein the corrosion preventive agent comprises a purine base.

9. The method for recovering a corrosion preventive agent in an EDM liquid supply apparatus according to claim 8, wherein the purine base is adenine.

* * * * *